United States Patent [19]

Tippetts

[11] 3,821,698

[45] June 28, 1974

[54] ALTITUDE ALERTING SYSTEM
[75] Inventor: Earl Levell Tippetts, Reno, Nev.
[73] Assignee: Lear Avia Corp., Reno, Nev.
[22] Filed: July 13, 1972
[21] Appl. No.: 271,562

[52] U.S. Cl. .......................................... 340/27 NA
[51] Int. Cl. ............................................ G05d 1/00
[58] Field of Search....... 340/27 R, 27 NA, 23, 181; 73/178 R

[56] References Cited
UNITED STATES PATENTS

| 3,077,109 | 2/1963 | Gold | 340/27 NA |
| 3,537,086 | 10/1970 | Andresen, Jr. | 340/27 R |
| 3,639,850 | 2/1972 | Brooks | 340/181 |
| 3,680,046 | 7/1972 | Bergey | 340/27 NA |
| 3,685,034 | 8/1972 | Hedrick | 340/27 NA |
| 3,715,718 | 2/1973 | Astengo | 340/27 R |

FOREIGN PATENTS OR APPLICATIONS

| 1,131,072 | 10/1968 | Great Britain | 340/27 NA |

Primary Examiner—Kathleen H. Claffy
Assistant Examiner—Thomas L. Kundert
Attorney, Agent, or Firm—Richard A. Marsen

[57] ABSTRACT

An alerter for use in aircraft to provide the pilot with visual and aural signaling of his altitude course with respect to a preselected flight altitude. A transducer senses the aircraft's altitude and generates corresponding electrical signals that are compared with that of the selected altitude. A computer-control unit derives alerting signals that selectively energize a "high" or a "low" pilot light to indicate when the pilot is above or below the desired altitude. A preset "inner" distance therefrom, as 500 feet in either direction, defines a clearance window that denotes on-altitude. Also, a horn is sounded when the plane departs from such inner window, as well as when it approaches within a preset "outer" range from the set altitude, as 1,000 feet. The pilot is thereby alerted by simple yet effective indications to guide him in acquiring or maintaining his desired altitude.

6 Claims, 4 Drawing Figures

PATENTED JUN 28 1974     3,821,698
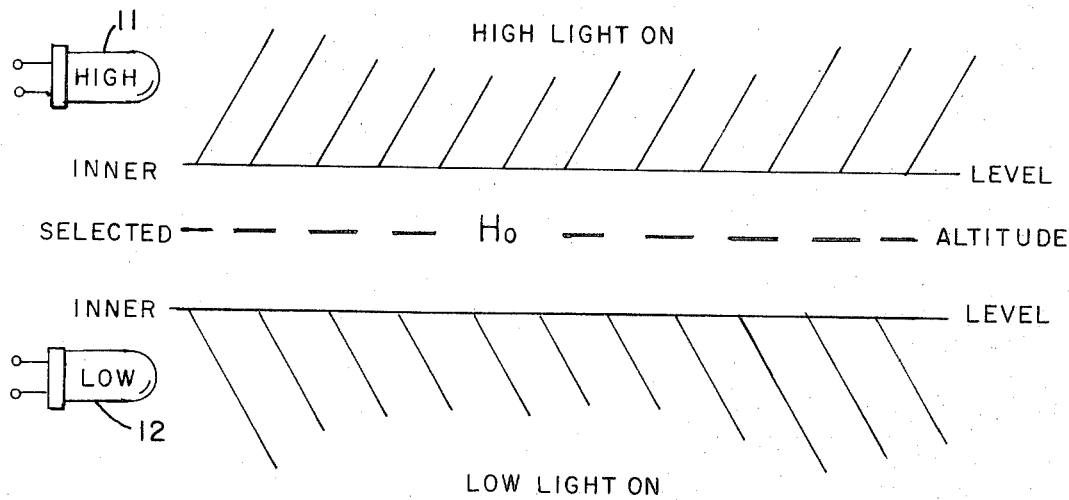
FIG. 1    VISUAL INDICATIONS
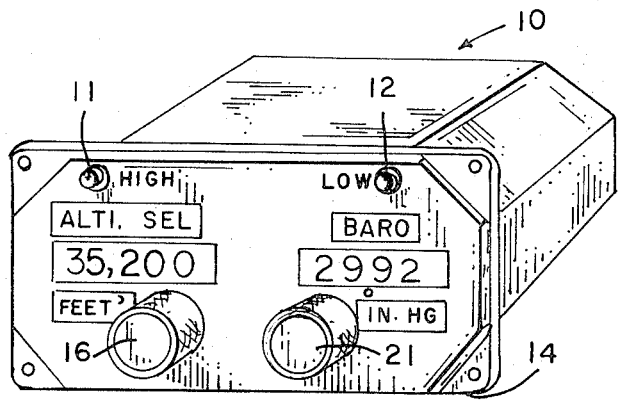
FIG. 2
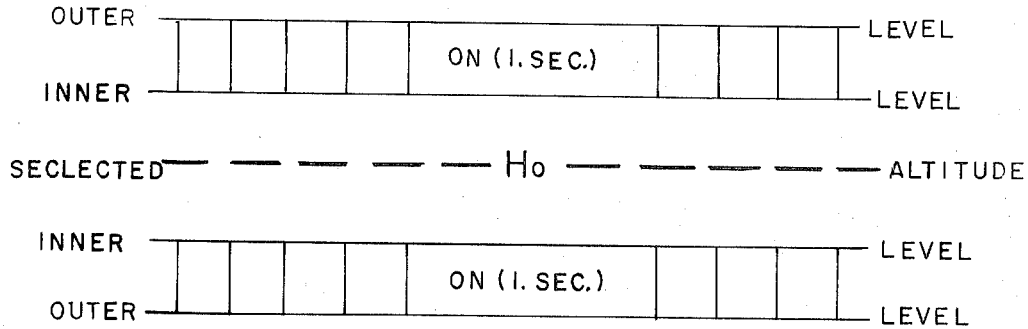
FIG. 3    AURAL WARNINGS

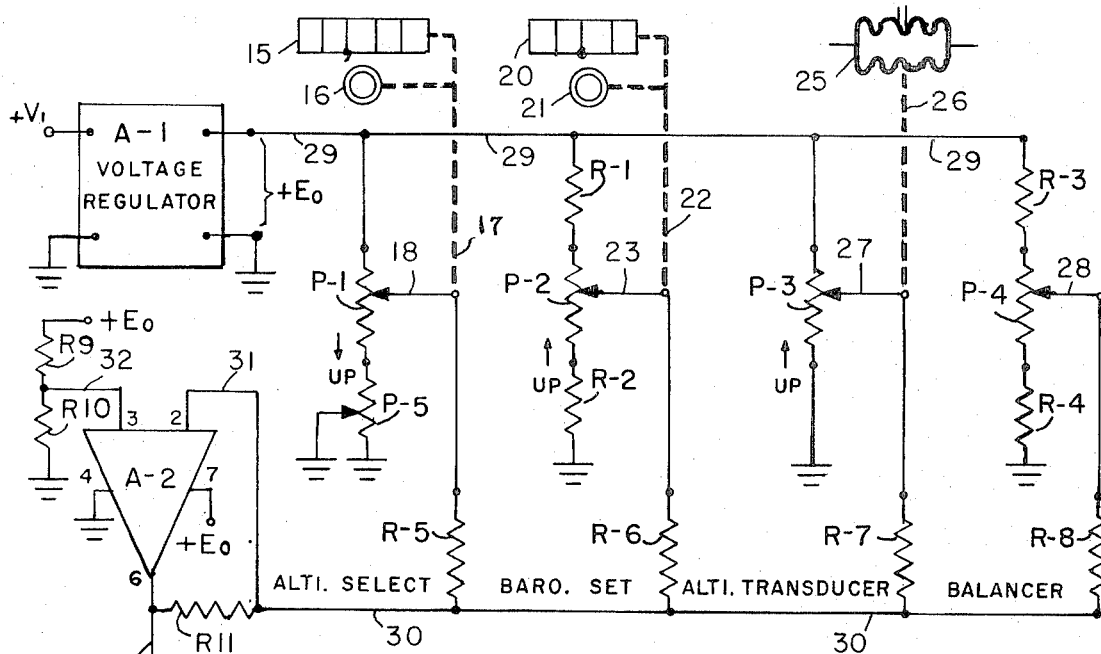
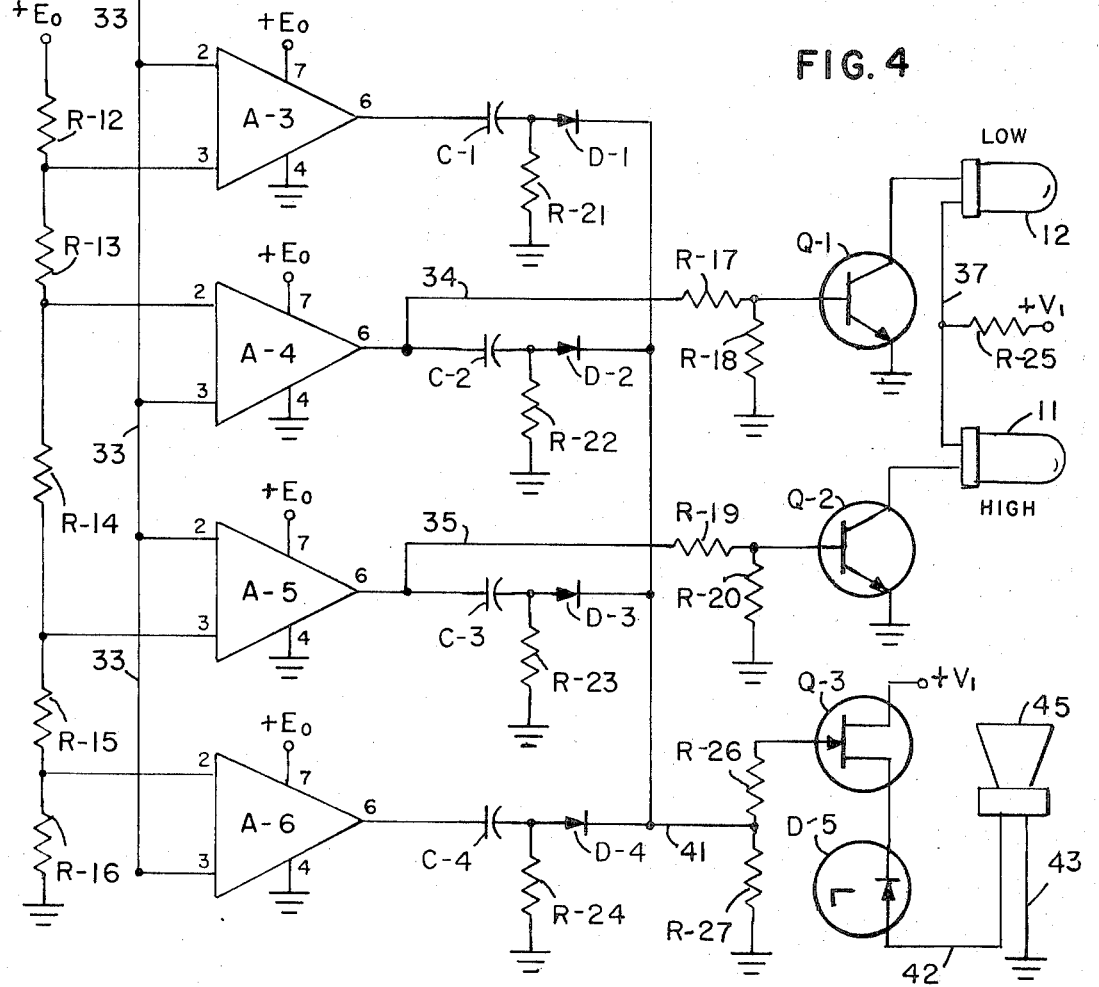
FIG. 4

ALTITUDE ALERTING SYSTEM

BACKGROUND AND SUMMARY OF THE INVENTION

The alerter hereof overcomes relatively complex and heavier means heretofore used to provide a pilot with information to indicate: (a) in which altitude direction to fly to attain a selected level; (b) when the plane is at that level; and (c) when it is departing therefrom. The Federal Aviation Authority set-up altitude alerting requirements for aircraft by ruling FAR-91.51 that started Aug. 31, 1971. It did not involve the important feature of direction-to-altitude, which the alerter system hereof accomplishes.

In operation, the pilot dials-in his desired altitude, as well as the barometric pressure. A visual indication appears if the aircraft is above or below the selected altitude by a preset distance or "inner level." On approach, an audio warning is activated for one second when the plane reaches a preset "outer level" from selected altitude. Once within the window of the inner levels, the pilot light is OFF. Should the aircraft deviate to outside of the inner window, both the audio and the visual warnings are activated. In practice, the inner and outer levels are factory preset through biasing resistors, as from 300 to 500 feet for the inner levels; and from 900 to 1,100 feet for the outer levels.

The alerter system of the present invention is relatively small. The exemplary computer-control unit has a panel 1.5 inches by 3.25 inches; requires only 0.080 amperes at 28 volts; is 5.0 inches long; and weighs 9 ounces. It is made with solid state electronics for high reliability. The pressure transducer is a separate unit, sensing ambient altitude and providing proportional electrical signals to the electronic circuit. The exemplary settings for desired altitude is adjustable to +50,000 feet; the barometer pressure settings from 28 to 31 inches of mercury.

BRIEF DESCRIPTION OF THE DRAWINGS

FIG. 1 is a diagrammatic showing of altitude level presentation of the visual indications by the alerter system hereof.

FIG. 2 is a perspective view of the electronic computer-control unit, showing its face panel.

FIG. 3 is a diagrammatic showing of the altitude level presentation of the aural warnings by the system hereof.

FIG. 4 is a schematic circuit diagram of the exemplary altitude alerting system.

THE ALERTER SYSTEM

The altitude alerting system comprises electronic computer-control section 10 that is connected with an altitude transducer 25 that provides electrical signals proportional to the ambient altitudes of the aircraft. The electronic section 10 contains face panel 14. Panel 14 includes the settable counters: (i) scale 15 for desired altitude select, with readings in feet that are set-up through knob 16; and (ii) scale 20 for the barometer setting, by knob 21, readings in inches of mercury. Panel 11 also contains "high" light 11, and "low" light 12. The alerter provides the pilot with means for selecting the desired flight altitude ($H_o$); and to alert him when he is at preset deviations from that altitude with visual and aural warnings. The visual off-altitude warnings are provided by the high (11) and low (12) pilot lights, the direction-to-fly also being given.

FIGS. 1 and 3 show the visual and aural alerting level placement about selected altitude $H_o$. The inner and outer alert levels are preset by resistor biasing to meet specific aircraft performance levels. Proper operation of the alerting signals may be readily checked-out by dialing-in the ambient field elevation by knob 16 on scale 15 of the alerter, then varying this scale reading above and below the field elevation enough to trip the warning signals. The barometric pressure setting 20 adds the proper altitude bias to the alerter.

In use, the pilot selects the desired altitude setting 15 ($H_o$) with knob 16, and dials-in the barometric pressure setting on scale 20 with knob 21. An alerting visual signal will appear if the aircraft is above the inner level, namely high light 11 goes ON; or when below, the low light 12 goes ON. As the aircraft on approach reaches the preset outer level, the audio warning is activated for one second. Once within the inner level window, the warning lights are OFF. When the aircraft deviates to outside of the inner window, both the audio and the visual warnings are initiated. In flight, when coming-in towards the $H_o$ altitude level, a horn is set-off, for one second duration as the plane passes through the outer level. When departing from the $H_o$ region, it is again set-off, to warn that the inner level window is being breached. The visual indicators remain ON when the aircraft is outside of the inner window region, with proper directional selection.

The overall electrical circuit of the exemplary alerter is shown schematically in FIG. 4. Altitude Select knob 16 is turned to set-up the desired altitude ($H_o$) in feet on scale 15. This knob is directly coupled by linkage 17 slider contact arm 18 of potentiometer P–1. Also, the Barometric Pressure is read-into scale 20, in inches of mercury via knob 21. Linkage 22 correspondingly positions slider contact arm 23 of potentiometer P–2 as a voltage bias correction. The altitude transducer comprises pressure capsule 25, the movements of which are directly coupled through arm 26 to wiper assembly 27 of potentiometer P–3. The exemplary altitude transducer has a capsule made of concentrically corrugated diaphgrams welded at their outer rims to form hollow flexible bellows with predictable motion in tbe altitude range. Its potentiometer P–3 is a resistance of smooth surface that coacts with a finger-wiper 27. The voltage output at contact 27 is proportional with ambient altitude of the plane. The potentiometers P–1 and P–2 are of the 10-turn servo type, linearly over the corresponding Altitude Select and Barometer Setting ranges hereof. The transducer 25 may be conveniently installed in an electronics bay of the plane.

The exemplary alerter system is energized from the 28 volt D.C. bus, indicated at $+V_1$. A conventional solid state voltage regulator circuit A–1 provides the steady system voltage $+E_o$ of 20 volts D.C. Potentiometer voltage line 29 connects to $+E_o$. Potentiometer P–1 is in series between line 29, trim-potentiometer P–5, and ground. Its contact arm 18 is moved downwardly in voltage level along P–1 for increasing (up) altitude settings on scale 15, as indicated. The barometer correction setting on scale 20 is translated to contact arm 23 of P–2, in the indicated increasing voltage direction (up) for the higher pressures. Potentiometer P–2 is centrally connected between the $+E_o$ voltage line 29 and ground with two equal resistors R-1, R-2.

Ambient altitude potentiometer P-3 is directly connected between line 29 and ground, its output voltage at contact arm 27 being linear between zero and 20 volts in the altitude increasing direction "up." It is noted that the voltage output directions of P-1 and P-3 are opposite herein: P-1 voltage decreasing with selected altitude level reading; and P-3 increasing with ambient altitude level. A balancer circuit (P-4) is factory preset: trim-potentiometer P-4 is connected in series between equal resistors R-3, R-4 across steady voltage line 29 and ground. The series trim-potentiometer P-5 in the altitude select P-1 circuit, together with P-4 are used to tune-up the overall balance and accuracy of operation of the alerter system, in factory or service.

The voltage outputs of potentiometers P-1, P-2, P-3 and P-4 are impressed upon pin 2 of summing operational amplifier A-2 through leads 30, 31. Its pin 3 is accurately biased to 10 volts by connection to the midpoint between two equal series resistors R-9, R-10 across a steady 20 volt terminal $+E_o$. Contact 18 of P-1 connects to amplifier A-2 input pin 2 through resistor R-5; contact 23 of P-2, through resistor R-6; contact 27 of P-3, through resistor R-7; and contact 28 of P-4, through resistor R-8. Resistors R-5, R-6, R-7 and R-8 are all of the same size, 200,000 ohms herein. R-9 and R-10 are each 47,000 ohms.

The respective voltage inputs to summing operational amplifier A-2 are added in a well-known manner. Pin 4 is grounded, and pin 7 is connected to the 20 volt terminal $+E_o$. The scale factor is determined by feedback resistor R-11, 390,000 ohms herein. The output level at pin 6 herein is 10-volts plus or minus 0.7 millivolts for each foot of "altitude error." Such error is the difference between selected altitude $H_o$ and the ambient altitude H. Altitude balance is "zero error," referenced at the 10-volt level. When the voltage outputs at contacts 18 and 27 respectively of the potentiometers P-1 and P-3 add up to a preset amount, 20 volts herein, the plane is substantially at the selected altitude $H_o$. The output of A-2 at pin 6 for "zero error" is this median 10-volts. The output of A-2 is "inverted," pine 2 being the inverting input point of A-2. Thus, when the ambient altitude H of the plane is below the selected altitude $H_o$ the net signal output of A-2 to line 33 is correspondingly above 10-volts. Conversely, the A-2 signal output (pin 6) is below the reference 10-volt level when the plane's altitude H is above $H_o$. When the plane is at the $H_o$ level, pin 6 is at 10-volts.

Four operational amplifiers A-3, A-4, A-5 and A-6 are used as signal comparators to trigger the visual indicators 11, 12 and the horn 45 in response to the electrical output signals of A-2 in a manner now set forth. The input pins (2 or 3) of these comparators are particularly biased by resistance chain R-12 to R-16 connected between a regulated 20-volt terminal $+E_o$ and ground. Their respective pins 4 are grounded, and pins 7 connect to $+E_o$. Comparator A-4 controls the energization of "low" pilot lamp 12; and A-5, that of "high" lamp 11: to effect the visual alerting patten of FIG. 1. Amplifiers A-3 to A-6 combine to control the operation of horn 45 to effect the aural alerting pattern of FIG. 3.

Towards this end, the exemplary resistance chain, to provide 300-feet "inner levels" and 900-feet "outer levels," comprises: R-12 and R-16 each at 11,000 ohms; R-13, R-14 and R-15 each at 470 ohms. The current through these resistors is 0.855 milliamperes, resulting in voltage biasing levels of: +10.6 volts at pin 3 at A-3; +10.2 volts at pin 2 of A-4; +9.8 volts at pin 3 at A-5; and +9.4 volts at pin 2 of A-6. As hereinabove stated, the scale factor of summing amplifier A-2 adds or subtracts 0.7 millivolts to line 33 per foot of altitude differential or "error." Thus, for the 300-foot "inner level" from selected altitude $H_o$, the "inverted" output signal to line 33 is 10.21 volts for amplifiers A-3 through A-6 when the plane is 300-feet below $H_o$; and conversely 0.79 volts when 300-feet above $H_o$.

Referring now to comparator A-4: The standby bias of its inverting input pin 2 is set at 10.2 volts, as aforesaid. At the 300 foot lower "inner level" the signal to its pin 3 is at 10.21 volts, 10 millivolts higher. Comparator A-4 is thereupon triggered on the plus side, with its output (pin-6) signal conducted by lead 34 to switching transistor Q-1 through coupling resistors R-17, R-18. While Q-1 is thus energized, its collector and emitter complete the circuit of "low" pilot light 12 from system voltage $+V_1$ through resistor R-25. While the ambient altitude H of the plane remains 300-feet and more below preset $H_o$, low pilot light 12 remains ON, per the FIG. 1 display. When the aircraft thereupon attains an altitude H within the 300-foot window, the signal from A-2 to pin 3 of A-4 is less than its reference bias of +10.2 volts, and the trigger amplifier A-2 stops energizing switching transistor Q-1, and "low" lamp 12 goes OFF.

When the plane rises above the 300-foot window, it being at or above the 300-foot "error" level, the inverted signal output from A-2 is +10.0 volts less 0.210 volts at the 300 foot position, namely +9.79 volts, and correspondingly less for higher levels. The non-inverting pin 3 of comparator A-5 is biased at +9.8 volts, and its inverting pin 2 is impressed with +9.79 volts or less. A-5 is thus triggered to activate "high" pilot light 11 through energization of switching transistor Q-2 via conductor 35 and input circuit R-19, R-29. The light 11 remains ON as long as the plane is above the inner window, per the FIG. 1 display. The horn 45 is switched ON when FET transistor Q-3 is activated. Horn 45 is in series between system $+V_1$ and ground through: transistor Q-3, diode D-5 and leads 42, 43. Horn 45 goes ON as the plane departs from the "inner window" levels, in either direction, per FIG. 3. This is accomplished upon the activation of A-4; its output pin connects to "wash-out" circuit series condenser C-2 and shunt resistor R-22, through diode D-2 and lead 40. The initial output signal is impressed upon Q-3 through input coupling R-26, R-27 (respectively at 100,000 ohms and 10,000 ohms). The washout circuit parameters are 1 microfarad for C-2 and 1 megohm for R-22 to provide a one-second duration for initial signals to Q-3. The horn 45 is thus triggered to ON in such intervals as the plane passes the levels for its activation per FIG. 3. Similarly, when the plane passes the 300-foot level above $H_o$, the signal from A-5 passes to Q-3 for one second through washout circuit C-3, R-23 and D-3.

When the plane is coming-in from beyond the outer levels, e.g., from beyond 900 feet from the $H_o$ level: the A-3 comparator is triggered if from below; and A-6 if from above. The bias for pin 3 of A-3 is +10.6 volts as set forth above. The inverted signal output from A-2 when 900-feet below $H_o$ is +10.0 volts plus 0.63 volts, namely +10.63 volts. Thus comparator A-3 provides a signal output to C-1, R-21 out through D-1 and lead 40 for one second duration as C-1 and R-21 have the same parameters as C-2, R-22 and C-3, R-23. Similarly, when approaching from the outer level (per FIG. 3) comparator A-6 is triggered at the 900 foot position. The signal then from A-2 is +10.0 volts minus 0.63 volts, or +9.37 volts. With inverting pin 2 set at +9.4 volts as aforesaid, A-2 is thereupon triggered to pass a signal to the horn circuit through the 1-second washout circuit C-4, R-24 and diode D-4. The parameter make-up of the resistance chain R-12 through R-16 determines the extent of the inner and outer levels, as stated hereinabove. For the visual levels of 300-feet R-14 is 470 ohms; for 400-feet, 680 ohms; for 500-feet, 910 ohms. For the aural levels of 900-feet, R-13 and R-15 each are 470 ohms; for 1,100-feet, 680 ohms. Other window levels are feasible with corresponding chain parameter changes, as will now be understood.

What is claimed is:

1. An altitude alerting system for an aircraft comprising an altitude transducer with a first adjustable resistance providing a first electrical signal of magnitude proportional to the ambient altitude of the aircraft, an indicator of desired aircraft altitude $H_o$ including manual means for selecting the altitude $H_o$ therein, a second adjustable resistance coupled with said manual means providing a second electrical signal of magnitude proportional to altitude $H_o$ selected, a "low" member actuated into visual display when the aircraft is below the selected altitude $H_o$ by more than a first preset distance, a "high" member that is actuated into visual display when the aircraft is above altitude $H_o$ by more than a second preset distance, a summing amplifier responsive to both of said electrical signals to provide a net control signal that corresponds to their magnitude difference, and electrical control means including a series of prebiased signal comparators responsive to said control signal to derive "low" range output signals when the aircraft is below the first preset (11 con.) distance from the $H_o$ level and "high" range output signals when it is above the second preset distance therefrom, said members being in circuit with said control means whereby the "low" member is actuated into display during below-$H_o$ flight range and the "high" member is actuated into display during above-$H_o$ flight range.

2. An altitude alerting system as claimed in claim 1, in which first and second of said comparators are selectively responsive to the control signal of said amplifier whereby the "low" and "high" range output signals are derived in correspondence with the relative magnitude of the control signal.

3. An altitude alerting system as claimed in claim 2, further including biasing means connected with the inputs of said first and second comparators to selectively determine control signal levels to trigger the respective comparators and establish regions above selected $H_o$ level of non-display by said members.

4. An altitude alerting system as claimed in claim 1, further including an aural indicator in circuit connection with the comparators, and circuit means for energizing said aural indicator for a predetermined interval in response initiation of the "low" and "high" range output signals.

5. An altitude alerting system as claimed in claim 3, further including an aural indicator in circuit connection with the comparators, and circuit means for energizing said aural indicator for a predetermined interval in response initiation of the "low" and "high" range output signals.

6. An altitude alerting system as claimed in claim 5, further including third and fourth comparators responsive to said control signal and selectively biased to provide respective output signals that correspond to preset outer levels above and below preset level $H_o$ whereby said aural indicator is actuated when the aircraft approaches into said respective outer levels.

* * * * *